United States Patent
Liu et al.

(10) Patent No.: US 9,253,094 B2
(45) Date of Patent: Feb. 2, 2016

(54) METHOD, DEVICE AND SYSTEM FOR BACKUP

(75) Inventors: Jun Liu, Beijing (CN); Wenhui Xie, Beijing (CN)

(73) Assignee: Huawei Digital Technologies (Cheng Du) Co., Ltd., Chengdu (CN)

( * ) Notice: Subject to any disclaimer, the term of this patent is extended or adjusted under 35 U.S.C. 154(b) by 431 days.

(21) Appl. No.: 13/480,827

(22) Filed: May 25, 2012

(65) Prior Publication Data

US 2012/0239804 A1     Sep. 20, 2012

Related U.S. Application Data

(63) Continuation of application No. PCT/CN2010/079159, filed on Nov. 26, 2010.

(30) Foreign Application Priority Data

Nov. 26, 2009    (CN) .......................... 2009 1 0247173

(51) Int. Cl.
     *G06F 15/173*      (2006.01)
     *H04L 12/801*      (2013.01)

(52) U.S. Cl.
     CPC ................ *H04L 47/10* (2013.01); *H04L 47/34* (2013.01)

(58) Field of Classification Search
None
See application file for complete search history.

(56) References Cited

U.S. PATENT DOCUMENTS

| | | | | |
|---|---|---|---|---|
| 6,912,197 B2* | 6/2005 | Mahamuni | ..................... | 370/219 |
| 7,987,326 B2* | 7/2011 | Nguyen | ........................ | 711/162 |
| 8,018,956 B1* | 9/2011 | Deng et al. | .................... | 370/401 |
| 8,363,549 B1* | 1/2013 | Zhu et al. | ..................... | 370/235 |
| 2009/0204981 A1* | 8/2009 | Karino et al. | ................. | 719/328 |
| 2009/0313241 A1* | 12/2009 | Elsen | ................................ | 707/5 |
| 2013/0019020 A1* | 1/2013 | Kang et al. | .................... | 709/227 |

FOREIGN PATENT DOCUMENTS

| | | |
|---|---|---|
| CN | 1791098 A | 6/2006 |
| CN | 101056195 A | 10/2007 |
| CN | 101114942 A | 1/2008 |
| CN | 101132347 A | 2/2008 |
| CN | 101577725 A | 11/2009 |

(Continued)

OTHER PUBLICATIONS

1st Office Action in corresponding Chinese Patent Application No. 200910247173.2 (Mar. 28, 2012).
International Search Report in corresponding International Patent Application No. PCT/CN2010/079159 (Mar. 10, 2011).

(Continued)

*Primary Examiner* — Joshua Joo
(74) *Attorney, Agent, or Firm* — Leydig, Voit & Mayer, Ltd.

(57) ABSTRACT

A method, a device, and a system for backup are disclosed. The method includes: receiving a backup packet; analyzing the backup packet to obtain a serial number of an active data packet, where the serial number is carried in the backup packet; calculating a sum of the serial number of the active data packet and a specific increment value to obtain a serial number of a standby data packet; and backing up the serial number of the standby data packet. Therefore, after the service is switched over from the active device to the standby device, the active device still regards the data packet sent by the former standby device as a new data packet and receives the data packet, which prevents service interruption caused by the switchover and improves continuity of service processing in the process of two-node cluster hot backup.

11 Claims, 6 Drawing Sheets

(56) References Cited

FOREIGN PATENT DOCUMENTS

| CN | 101714916 A | 5/2010 |
|---|---|---|
| CN | 101714916 B | 6/2013 |
| WO | WO 2008105032 A1 | 9/2008 |

OTHER PUBLICATIONS

Written Opinion of the International Searching Authority in corresponding International Patent Application No. PCT/CN2010/079159 (Mar. 10, 2011).

* cited by examiner

METHOD, DEVICE AND SYSTEM FOR BACKUP

CROSS-REFERENCE TO RELATED APPLICATIONS

This application is a continuation of International Application PCT/CN2010/079159, filed on Nov. 26, 2010, which claims priority to Chinese Patent Application No. 200910247173.2, filed on Nov. 26, 2009, which is hereby incorporated by reference in its entirety.

FIELD OF THE INVENTION

The present invention relates to network security technologies, and in particular, to a method, a device, and a system for backup.

BACKGROUND OF THE INVENTION

In a traditional networking mode, the service is interrupted once a link is cut. The interruption of certain important services such as telecom service and bank service brings huge negative impact and economic loss. To avoid such consequences, redundant devices are networked to ensure that the standby device takes over services automatically in the case of failure of the active device, which ensures continuity of the services and is known as two-node cluster hot backup.

When enterprises or persons distributed in different areas communicate through the Internet, the communication needs to traverse unknown networks because the communication parties are located in different geographic regions, which leads to uncertainty of data security on the Internet. The IP Security (IPSec) protocol enables enterprises and users in different geographical regions to set up and manage Virtual Private Network (VPNs), and authenticates and encrypts transmitted data packets to prevent the data from being illegally viewed or altered when the data is transmitted in the Intranet or the Internet.

In the conventional two-node hot backup mode, the active device sends information as packets to be backed-up to the standby device at intervals. When the active device fails, certain information generated after the last backup (such as serial number of the data) is lost. Consequently, after switchover to the standby device, the data packets sent by the former standby device are mistakenly regarded as old packets and are discarded, which leads to interruption of certain services such as IPSec VPN services.

SUMMARY OF THE INVENTION

An embodiment of the present invention provides a method, a device, and a system for backup to improve continuity of service processing in two-node hot backup.

An embodiment of the present invention provides a backup method, including:
receiving a packet to be backed-up;
obtaining a serial number of data packet from an active device by analyzing the packet, wherein the serial number is carried in the packet;
obtaining a serial number of a data packet from a standby device by calculating the serial number of the data packet from the active device and a specific increment value;
determining that an increment of the serial number of the data packet from the active device exceeds a first increment threshold; and
backing up the serial number of the data packet from the standby device upon the determination.

An embodiment of the present invention provides a backup method, including:
obtaining a serial number of data packet from an active device;
obtaining a serial number of data packet from a standby device by calculating a sum of the serial number of the data packet from the active device and a specific increment value;
packaging the serial number of the data packet from the standby device into a packet to be backed-up; and
sending the packet to be backed-up.

An embodiment of the present invention provides a backup device, including:
a first receiving module, configured to receive a backup packet;
a first receiving module, configured to receive a packet to be backed-up;
a first analyzing module, configured to obtain a serial number of data packet from an active device by analyzing the packet, wherein the serial number is carried in the packet;
a first summing module, configured to obtain a serial number of a data packet from a standby device by calculating the serial number of the data packet from the active device and a specific increment value; and
a first backup module, configured to determine that an increment of the serial number of the data packet from the active device exceeds a first increment threshold and back up the serial number of the data packet from the standby device upon the determination.

An embodiment of the present invention provides another backup device, including:
a first obtaining module, configured to obtain a serial number of data packet from an active device t;
a second summing module, configured to obtain a serial number of data packet from a standby device by calculating a sum of the serial number of the data packet from the active device and a specific increment value;
a first packaging module, configured to package the serial number of the data packet from the standby device into a packet to be backed-up; and
a first sending module, configure to send the packet to be backed-up.

An embodiment of the present invention provides a backup system that includes the foregoing backup device.

Through the method, the device and the system for backup in the embodiments of the present invention, the active device or the standby device pre-increases the serial number of the data packet from the active device when backing up the serial number, and therefore, after the service is switched over from the active device to the standby device, the active device still regards the data packet sent by the former standby device as a new data packet and receives the data packet, which prevents service interruption caused by the switchover and improves continuity of service processing in the process of two-node cluster hot backup.

BRIEF DESCRIPTION OF THE DRAWINGS

To make the technical solution of the present invention clearer, the accompanying drawings involved in description of the embodiments of the present invention are outlined below. Evidently, the accompanying drawings outlined below are not exhaustive, and those skilled in the art can derive other drawings from them without any creative effort.

DETAILED DESCRIPTION OF THE EMBODIMENTS

The following detailed description is given in conjunction with the accompanying drawings to provide a thorough understanding of the present invention. Evidently, the drawings and the detailed description are merely representative of particular embodiments of the present invention rather than all embodiments. All other embodiments, which can be derived by those skilled in the art from the embodiments given herein without any creative effort, shall fall within the protection scope of the present invention.

Figure 1:
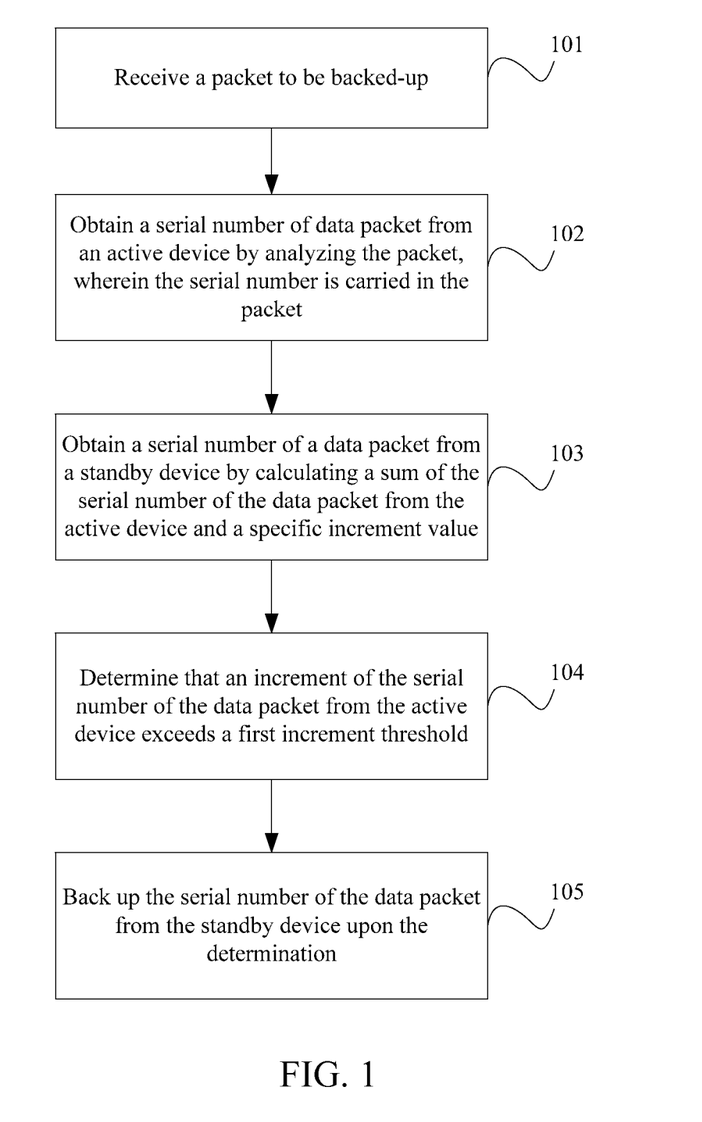
FIG. 1 is schematic diagram of a backup method according to an embodiment of the present invention.

FIG. 1 is schematic diagram of a backup method according to an embodiment of the present invention. The method in this embodiment includes the following steps:

Step 101: Receive a packet to be backed-up.

Step 102: Obtain a serial number of data packet from an active device by analyzing the packet, wherein the serial number is carried in the packet Step 103: Obtain a serial number of a data packet from a standby device by calculating the serial number of the data packet from the active device and a specific increment value.

Step 104: Determine that an increment of the serial number of the data packet from the active device exceeds a first increment threshold Step 105: Back up the serial number of the data packet from the standby device upon the determination.

The entity for performing steps of this embodiment may be a standby device engaged in an information backup process, and may be a router.

In the process of developing the present invention, the inventor finds that the two-node cluster hot backup in the prior art is a process of copying the data of the active device to the standby device at intervals. Consequently, when the active device fails, the information generated from the last backup to the occurrence of the failure is not backed up on the standby device, and the former standby device does not work properly after the service is switched over from the active device to the standby device. For example, when an IPsec VPN service is in progress, it is set that the data packets from the active device are backed up every time when the serial number of the data packet from the active device increases by 1000. Assume the following scenario: The active device sends the serial number 1000 of the data packet from the active device as backup to the standby device, and then goes on communicating with the peer device; the active device breaks down abruptly when the serial number of the data packet from the active device increases to 1200. At this time, the serial number of the data packet from the standby device is still 1000, and the standby device that takes over the service sends the data packet at 1000. However, upon receiving the data packet numbered 1000, the peer device regards the data packet as having received, and discards it. Consequently, the VPN service is faulty. The inventor of the present invention further discovers that: In the real-time backup, every change of the serial number of the data packet from the active device is backed up to the standby device, and a packet to be backed-up needs to be sent whenever a data packet is sent, which leads to very great signaling overhead. Moreover, in practice, a certain update delay exists, and the backup may still be delayed. Therefore, the inventor of the present invention puts forward the following embodiment of the present invention.

After receiving the packet to be backed-up sent by the active device, the standby device analyzes the packet to be backed-up to obtain the serial number of the data packet from the active device, which is the serial number of the data packet from the active device at the time of backing up. Considering that active/standby switchover may occur in the future, the active device and the standby device pre-increase the serial number at the time of backing up the serial number. The specific increment Δ should be greater than the serial number difference between two backups, namely, a first increment threshold.

For example, Δ may be set to 2-4 multiplied by the first increment threshold. In this way, even if the backup fails for 1-3 times, the serial number of the data packet from the standby device is still greater than that of the peer device after the service is switched over from the active device to the standby device. The standby device backs up the increased serial number of the data packet. The data packet serial number backed up in the standby device is the serial number of the standby data packet. As described above, the serial number of the standby data packet is the sum of the serial number of the data packet from the active device and the increment. When the active device fails and the standby device takes over the service, after the active device receives the data packet sent by the former standby device, although the serial numbers of the data packets are not continuous, the active device still regards and processes the received data packet as a new data packet so long as the serial number of the data packet is greater than the data packet serial number stored in the active device, and therefore, the service goes on normally.

For example, as regards backup of the serial number of tunnels, for the active device, when the serial number of the tunnel of the active device reaches the first increment threshold, the serial number backup is triggered. The trigger condition may be set as condition (1):

$$\text{Seq\_num\_active} \% N = 1 \qquad (1)$$

In condition (1):

Seq_num_active is an outbound serial number of the tunnel of the active device at the time of triggering backup; and N is a preset fixed value. A smaller value of N refers to a higher frequency of backup; conversely, a higher value of N refers to a lower frequency of backup.

After receiving the packet to be backed-up, the standby device pre-increases the serial number of the corresponding tunnel of the standby device according to the serial number of the active device. For example, the serial number is set as:

$$\text{Seq\_num\_standby} > \text{Seq\_num\_active} \qquad (2)$$

$$\text{Seq\_num\_standby} - (\text{Seq\_num\_active} - 1) = N \times K \qquad (3)$$

$$\text{Seq\_num\_standby} \% N = 0 \qquad (4)$$

where

Seq_num_standby is an outbound serial number of the corresponding tunnel of the standby device; and K is a selected integer value and $2 \leq K \leq 4$ preferably.

In this embodiment, the Seq_num_standby value is pre-increased according to the Seq_num_active value in the packet to be backed-up. Therefore, after the service is switched over from the active device to the standby device, the serial number of the packet sent by the new active device always falls within the sliding window of the active device so long as the pre-increase value is proper, regardless of backup time or backup delay. The active device does not regard the packet as a replayed packet.

Through the backup method in this embodiment, the serial number of the data packet from the active device is pre-increased when being backed up, and therefore, after the service is switched over from the active device to the standby device, the active device still regards the data packet sent by the former standby device as a new data packet and receives the data packet, which prevents service interruption caused by the switchover and improves continuity of service processing in the process of two-node cluster hot backup.

Figure 2:
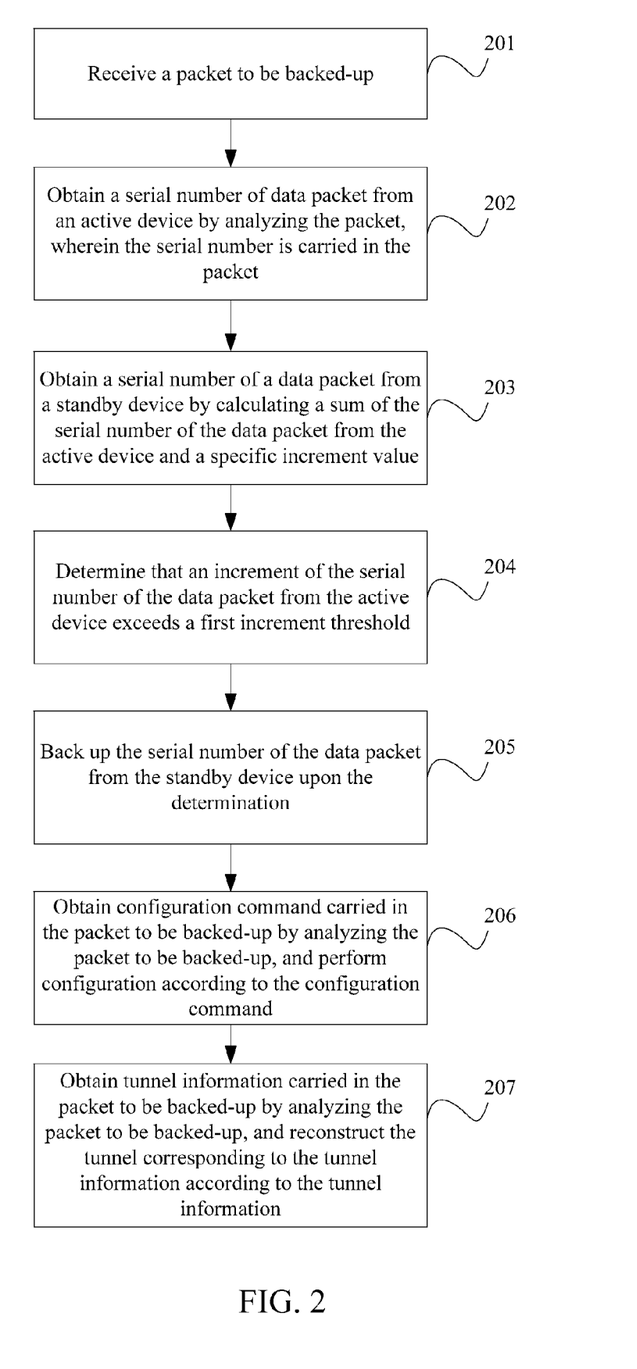
FIG. 2 is schematic diagram of another backup method according to an embodiment of the present invention.

FIG. 2 is schematic diagram of another backup method according to an embodiment of the present invention. The method in this embodiment includes the following steps:

Step 201: Receive a packet to be backed-up.

Step 202: Obtain a serial number of data packet from an active device by analyzing the packet, wherein the serial number is carried in the packet.

Step 203: Obtain a serial number of a data packet from a standby device by calculating the serial number of the data packet from the active device and a specific increment value.

Step 204: Determine that an increment of the serial number of the data packet from the active device exceeds a first increment threshold.

Step 205: Back up the serial number of the data packet from the standby device upon the determination.

Step 206: Obtain configuration command carried in the packet to be backed-up by analyzing the packet to be backed-up, and perform configuration according to the configuration command; and/or Step 207: Obtain tunnel information carried in the packet to be backed-up by analyzing the packet to be backed-up, and reconstruct the tunnel corresponding to the tunnel information according to the tunnel information.

The entity for performing steps of this embodiment may be a standby device engaged in an information backup process, and may be a router.

This embodiment differs from the previous embodiment in that: after the data packet serial number is backed up, the configuration command and the tunnel information are backed up. Such backup is generally triggered by a specific event, for example, after two-node cluster hot backup is configured between two devices, after the device is restarted, or after the active device and the standby device are determined initially through negotiation; or the backup is triggered by the user. In such scenarios, complete data needs to be backed up at a single attempt.

The active device needs to sends the configuration information as backup to the standby device as triggered by user or by one of the following events: the active device finishes configuring a two-node cluster hot backup command, the device is restarted, and the active device and the standby device are determined initially through negotiation. If the standby device lacks such configuration information, the former standby device is unable to restore the state of the former active device after the service is switched from the active device to the standby device, which leads to service interruption. In this embodiment, the process of backing up the configuration information is: The active device sends to the standby device the configuration command that is generated and ready for being backed up; and the standby device receives the backup packet that carries the configuration information, analyzes the backup packet, generates the same configuration command, and configures itself. In this embodiment, the trigger mode may be: The user triggers batch backup of packets manually. The active device needs to sends the tunnel information as backup to the standby device as triggered by user or by one of the following events: the active device finishes configuring a two-node cluster hot backup command, the device is restarted, and the active device and the standby device are determined initially through negotiation. If the standby device lacks such tunnel information, the former standby device is unable to restore the established tunnel after the service is switched from the active device to the standby device, which leads to service interruption. In this embodiment, the process of backing up the tunnel information is: The active device sends the tunnel information to the standby device; and the standby device receives the packet to be backed-up that carries the tunnel information, analyzes the backup packet, and reconstructs tunnels.

The method for backing up the data packet serial number in this embodiment is the same as that of the previous embodiment, and is not repeated here any further.

Through the backup method in this embodiment, the serial number of the data packet from the active device is pre-increased when being backed up, and therefore, after the service is switched over from the active device to the standby device, the active device still regards the data packet sent by the former standby device as a new data packet and receives the data packet, which prevents service interruption caused by the switchover. Besides, more data is backed up, and therefore, the complete data is backed up upon occurrence of an exceptional event, and the continuity of service processing is improved in the process of two-node cluster hot backup.

Figure 3:
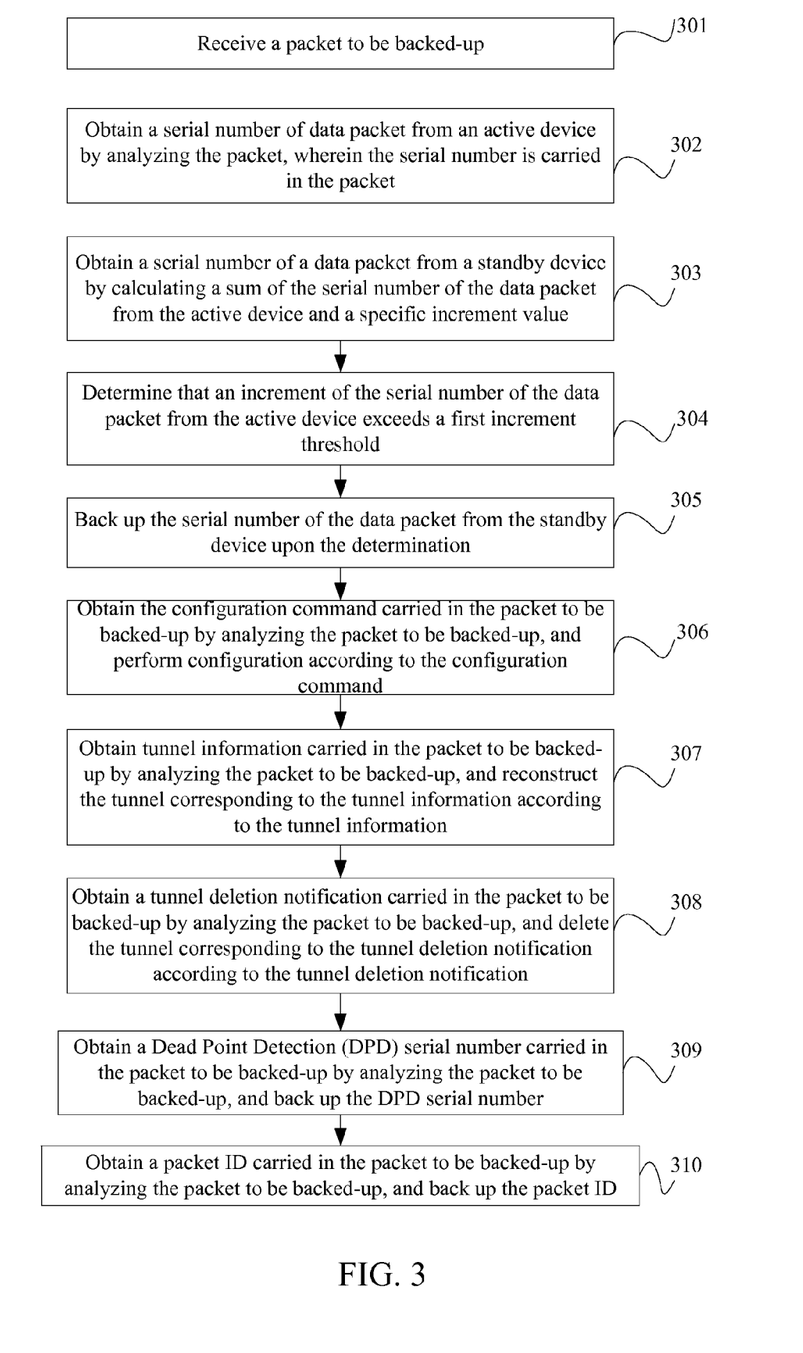
FIG. 3 is schematic diagram of another backup method according to an embodiment of the present invention.

FIG. 3 is schematic diagram of another backup method according to an embodiment of the present invention. The method in this embodiment includes the following steps:

Step 301: Receive a packet to be backed-up.

Step 302: Obtain a serial number of data packet from an active device by analyzing the packet, wherein the serial number is carried in the packet Step 303: Obtain a serial number of a data packet from a standby device by calculating the serial number of the data packet from the active device and a specific increment value.

Step 304: Determine that an increment of the serial number of the data packet from the active device exceeds a first increment threshold.

Step 305: Back up the serial number of the data packet from the standby device upon the determination.

Step 306: Obtain the configuration command carried in the packet to be backed-up by analyzing the packet to be backed-up, and perform configuration according to the configuration command; and/or step 307: Obtain tunnel information carried in the packet to be backed-up by analyzing the packet to be backed-up, and reconstruct the tunnel corresponding to the tunnel information according to the tunnel information; and/or step 308: Obtain a tunnel deletion notification carried in the packet to be backed-up by analyzing the packet to be backed-up, and delete the tunnel corresponding to the tunnel deletion notification according to the tunnel deletion notification; and/or step 309: Obtain a Dead Point Detection (DPD) serial number carried in the packet to be backed-up by analyzing the packet to be backed-up, and back up the DPD serial number; and/or step 310: Obtain a packet ID carried in the packet to be backed-up by analyzing the packet to be backed-up, and back up the packet ID.

The entity for performing steps of this embodiment may be a standby device engaged in an information backup process, and may be a router.

This embodiment differs from the embodiment shown in FIG. 1 in that: Upon change of the configuration command, tunnel information, tunnel deletion notification, packet ID, or DPD serial number of the active device, the active device backs up the change information automatically, and sends a packet to be backed-up to the standby device. After receiving the packet to be backed-up, the standby device analyzes the packet, and backs up the corresponding information. The backup mode may be batch backup, real-time, or periodical backup. Generally, real-time backup occurs immediately as triggered, and periodical backup occurs as triggered when certain conditions are met. Periodical backup is suitable for the state data that does not impact the service stability seriously or the state data not sensitive to real-time, because that improves backup efficiency while meeting the service requirement. Upon change of the configuration command of the active device, the active device needs to send the configuration information as backup to the standby device. If the standby device lacks such configuration information, the former standby device is unable to restore the state of the former active device after the service is switched from the active device to the standby device, which leads to service interruption. In this embodiment, the process of backing up the configuration information is: The active device sends to the standby device the configuration command that is generated and ready for being backed up; and the standby device receives the packet to be backed-up that carries the configuration information, analyzes the packet, generates the same configuration command, and configures itself.

Once the active device creates a new tunnel, the active device needs to send the tunnel information as backup to the standby device. If the standby device lacks such tunnel information, the former standby device is unable to restore the new tunnel after the service is switched from the active device to the standby device, which leads to service interruption. In this embodiment, the process of backing up the tunnel information is: The active device sends the tunnel information to the standby device; and the standby device receives the backup packet that carries the tunnel information, analyzes the packet to be backed-up, and reconstructs the new tunnel.

Once the active device deletes a tunnel, the active device needs to send a tunnel deletion notification as backup to the standby device. If the standby device lacks such tunnel deletion notification, the former standby device still keeps the deleted tunnel after the service is switched from the active device to the standby device. In this embodiment, the process of backing up the tunnel information is: The active device sends the tunnel deletion notification to the standby device; and the standby device receives the packet to be backed-up that carries the tunnel deletion notification, analyzes the packet, and deletes the corresponding tunnel.

Once the active device updates a DPD serial number, the active device needs to send the DPD serial number as backup to the standby device. In this embodiment, the process of backing up the DPD serial number is: The active device sends the DPD serial number to the standby device; and the standby device receives the packet to be backed-up that carries the DPD serial number, analyzes the packet, finds the corresponding tunnel according to the tunnel ID in the packet, and modifies the existing DPD serial number of the tunnel according to the received DPD serial number.

Once the active device updates a packet ID serial number, the active device needs to send the packet ID serial number as backup to the standby device. In this embodiment, the process of backing up the packet ID serial number is: The active device sends the packet ID serial number to the standby device; and the standby device receives the packet to be backed-up that carries the packet ID serial number, analyzes the packet, finds the corresponding tunnel according to the tunnel ID in the packet, and modifies the existing packet ID serial number according to the received packet ID serial number. When modifying the packet ID serial number, the standby device simply modifies it to a value that is the same as the packet ID serial number of the active device.

Through the backup method in this embodiment, the serial number of the active data packet is pre-increased when being backed up, and therefore, after the service is switched over from the active device to the standby device, the active device still regards the data packet sent by the former standby device as a new data packet and receives the data packet, which prevents service interruption caused by the switchover. In this embodiment, a trigger condition is added, and therefore, the backup is performed proactively upon change of the active device information, which reduces the probability of error occurrence and service interruption and improves the continuity of service processing in the process of two-node cluster hot backup.

Figure 4:
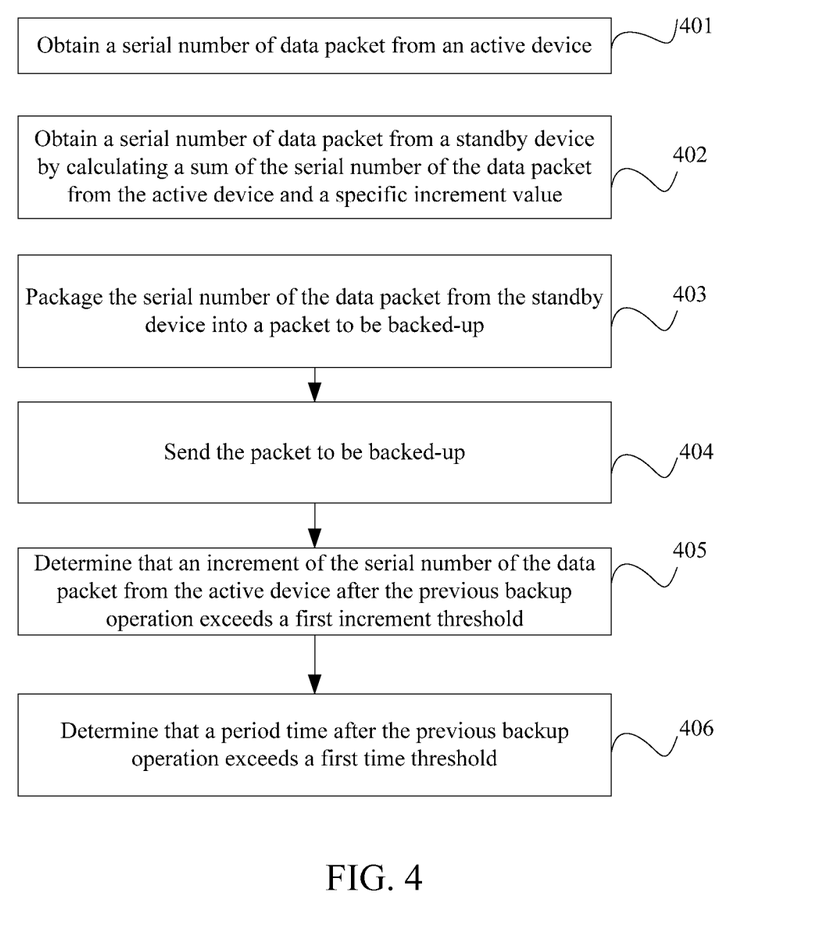
FIG. 4 is schematic diagram of another backup method according to an embodiment of the present invention.

FIG. 4 is schematic diagram of another backup method according to an embodiment of the present invention. The method in this embodiment includes the following steps:

Step 401: Obtain a serial number of data packet from an active device.

Step 402: Obtain a serial number of data packet from a standby device by calculating a sum of the serial number of the data packet from the active device and a specific increment value.

Step 403: Package the serial number of the data packet from the standby device into a packet to be backed-up.

Step 404: Send the packet to be backed-up.

The entity for performing steps of this embodiment may be an active device engaged in an information backup process, and may be a router. This embodiment differs from the embodiment shown in FIG. 1 in that the active device pre-increases the serial number of the data packet from the active device. The active device sends the pre-increased serial number of the standby data packet to the standby device, and the standby device backs up the serial number of the standby data packet locally.

The method in this embodiment may further include the following steps:

Step 405: Determine that an increment of the serial number of the data packet from the active device after the previous backup operation exceeds a first increment threshold; or Step 406: Determine that a period time after the previous backup operation exceeds a first time threshold.

For example, the first time threshold in this embodiment is 200 ms, indicating that the active device triggers the increase of the serial number every 200 ms. Through the backup method in this embodiment, the serial number of the active data packet is pre-increased when being backed up, and therefore, after the service is switched over from the active device to the standby device, the active device still regards the data packet sent by the former standby device as a new data packet and receives the data packet, which prevents service interruption caused by the switchover. In this embodiment, a trigger condition is added to reduce the probability of errors and service interruption and improve the continuity of service processing in the process of two-node cluster hot backup.

Figure 5:
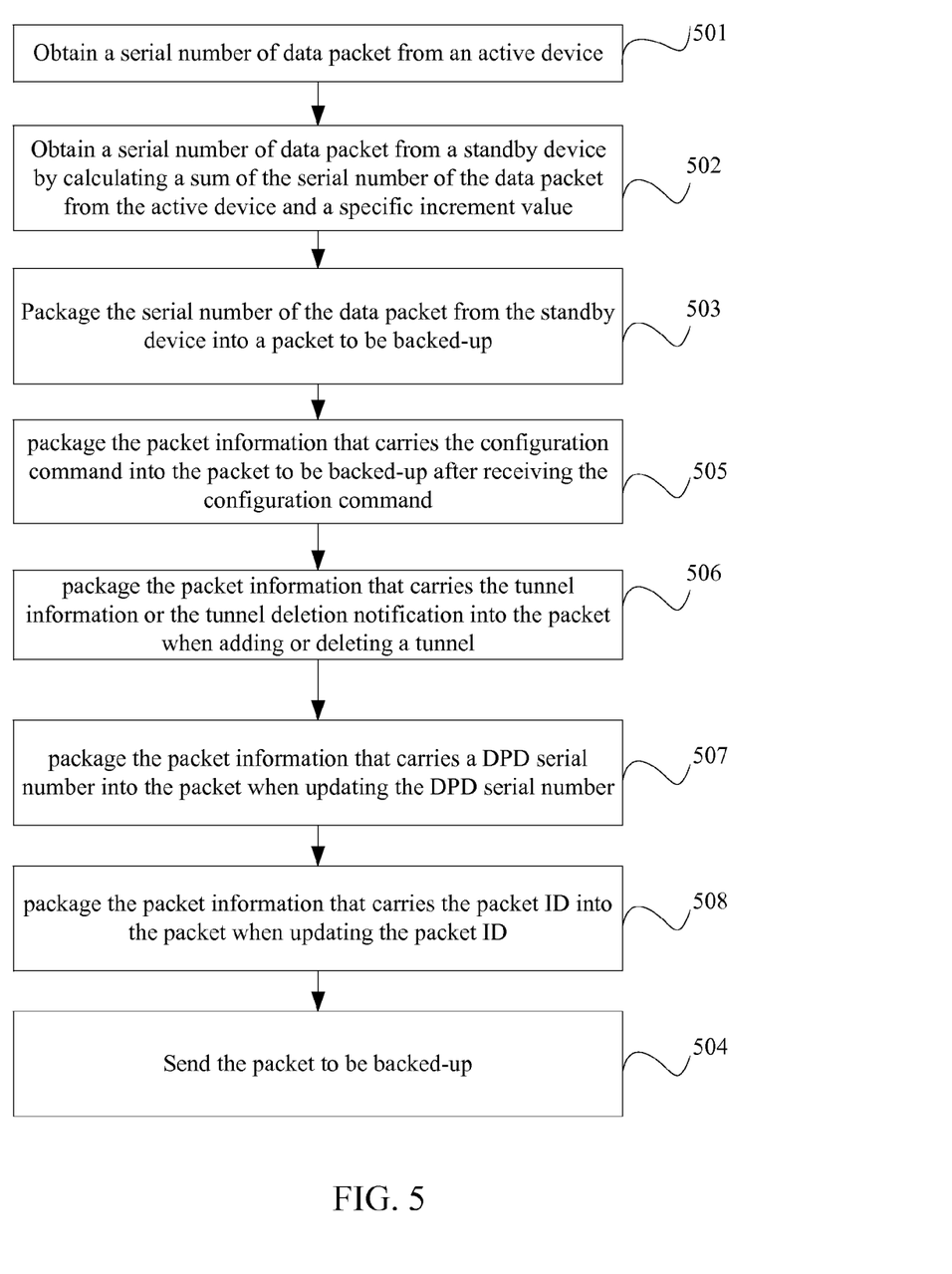
FIG. 5 is schematic diagram of another backup method according to an embodiment of the present invention.

FIG. 5 is schematic diagram of another backup method according to an embodiment of the present invention. The method in this embodiment includes the following steps:

Step 501: Obtain a serial number of data packet from an active device.

Step 502: Obtain a serial number of data packet from a standby device by calculating a sum of the serial number of the data packet from the active device and a specific increment value.

Step 503: Package the serial number of the data packet from the standby device into a packet to be backed-up.

Step 505: package the packet information that carries the configuration command into the packet to be backed-up after receiving the configuration command; and/or step 506: package the packet information that carries the tunnel information or the tunnel deletion notification into the packet when adding or deleting a tunnel; and/or step 507: package the packet information that carries a DPD serial number into the packet when updating the DPD serial number; and/or step 508: package the packet information that carries the packet ID into the packet when updating the packet ID.

Step 504: Send the packet to be backed-up.

The entity for performing steps of this embodiment may be an active device engaged in an information backup process, and may be a router. This embodiment differs from the embodiment shown in FIG. 3 in that the active device pre-increases the serial number of the active data packet.

Upon receiving the configuration information delivered by an upper-layer device or the user, the active device needs to send the configuration information as backup to the standby device. If the standby device lacks such configuration information, the former standby device is unable to restore the state of the former active device after the service is switched from the active device to the standby device, which leads to service interruption. In this embodiment, the process of backing up the configuration information is: The active device sends to the standby device the configuration command that is generated and ready for being backed up; and the standby device receives the packet to be backed-up that carries the configuration information, analyzes the packet, generates the same configuration command, and configures itself.

Once the active device creates a new tunnel, the active device needs to send the tunnel information as backup to the standby device. If the standby device lacks such tunnel information, the former standby device is unable to restore the new tunnel after the service is switched from the active device to the standby device, which leads to service interruption. In this embodiment, the process of backing up the tunnel information is: The active device sends the tunnel information to the standby device; and the standby device receives the packet to be backed-up that carries the tunnel information, analyzes the packet, and reconstructs the new tunnel.

Once the active device deletes a tunnel, the active device needs to send a tunnel deletion notification as backup to the standby device. If the standby device lacks such tunnel deletion notification, the former standby device still keeps the deleted tunnel after the service is switched from the active device to the standby device. In this embodiment, the process of backing up the tunnel information is: The active device sends the tunnel deletion notification to the standby device; and the standby device receives the packet to be backed-up that carries the tunnel deletion notification, analyzes the packet, and deletes the corresponding tunnel.

Once the active device updates a DPD serial number, the active device needs to send the DPD serial number as backup to the standby device. In this embodiment, the process of backing up the DPD serial number is: The active device sends the DPD serial number to the standby device; and the standby device receives the backup packet that carries the DPD serial number, analyzes the backup packet, finds the corresponding tunnel according to the tunnel ID in the packet, and modifies the DPD serial number.

Once the active device updates a packet ID serial number, the active device needs to send the packet ID serial number as backup to the standby device. In this embodiment, the process of backing up the packet ID serial number is: The active device sends the packet ID serial number to the standby device; and the standby device receives the packet to be backed-up that carries the packet ID serial number, analyzes the packet, finds the corresponding tunnel according to the tunnel ID in the packet, and modifies the packet ID serial number.

Through the backup method in this embodiment, the serial number of the active data packet is pre-increased when being backed up, and therefore, after the service is switched over from the active device to the standby device, the active device still regards the data packet sent by the former standby device as a new data packet and receives the data packet, which prevents service interruption caused by the switchover. Besides, more data is backed up, and therefore, the complete data is backed up upon occurrence of an exceptional event, and the continuity of service processing is improved in the process of two-node cluster hot backup.

Figure 6:
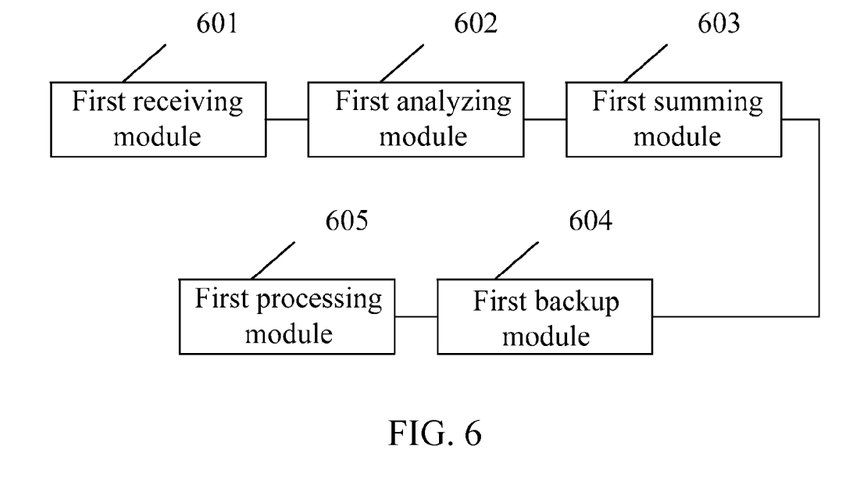
FIG. 6 is schematic diagram of a backup device according to an embodiment of the present invention.

FIG. 6 is schematic diagram of a backup device according to an embodiment of the present invention. The method in this embodiment includes the following module:

a first receiving module 601, configured to receive a packet to be backed-up; a first analyzing module 602, configured to obtain a serial number of data packet from an active device by analyzing the packet, wherein the serial number is carried in the packet; a first summing module 603, configured to obtain a serial number of a data packet from a standby device by calculating the serial number of the data packet from the active device and a specific increment value; and a first backup module 604, configured to determine that an increment of the serial number of the data packet from the active device exceeds a first increment threshold and back up the serial number of the data packet from the standby device upon the determination.

The backup device described in this embodiment may be a router, and is designed to implement the method shown in FIG. 1. The backup device in this embodiment may further include:

a first processing module 605, configured to: obtain a configuration command carried in the packet to be backed-up by analyzing the packet to be backed-up, and perform configuration according to the configuration command; and/or obtain tunnel information carried in the packet to be backed-up by analyzing the packet to be backed-up, and reconstruct a tunnel corresponding to the tunnel information according to the tunnel information; and/or obtain a tunnel deletion notification carried in the packet to be backed-up by analyzing the packet to be backed-up, and delete a tunnel corresponding to the tunnel deletion notification according to the tunnel deletion notification; and/or obtain a Dead Point Detection (DPD) serial number carried in the packet to be backed-up by analyzing the packet to be backed-up, and back up the DPD serial number; and/or obtain a packet identifier (ID) carried in the packet to be backed-up by analyzing the packet to be backed-up, and back up the packet ID.

The backup device described in this embodiment may be a router, and is designed to implement the methods shown in FIG. 2 and FIG. 3.

Through the backup device in this embodiment, the first summing module pre-increases the serial number of the data packet from the active device when backing up the serial number, and therefore, after the service is switched over from the active device to the standby device, the active device still regards the data packet sent by the former standby device as a new data packet and receives the data packet, which prevents service interruption caused by the switchover. Besides, the first processing module in this embodiment adds more backup data, and therefore, the complete data is backed up upon occurrence of an exceptional event, and the continuity of service processing is improved in the process of two-node cluster hot backup.

Figure 7:
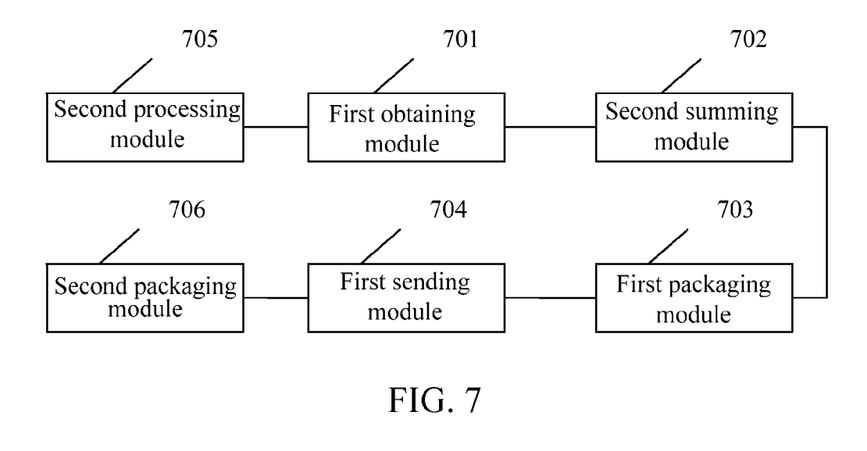
FIG. 7 is schematic diagram of another backup device according to an embodiment of the present invention.

FIG. 7 is schematic diagram of another backup device according to an embodiment of the present invention. The backup device in this embodiment includes the following modules:

a first obtaining module 701, configured to obtain a serial number of data packet from an active device; a second summing module 702, configured to obtain a serial number of data packet from a standby device by calculating a sum of the serial number of the data packet from the active device and a specific increment value; and a first packaging module 703, configured to package the serial number of the data packet from the standby device into a packet to be backed-up; and a first sending module 704, configure to send the packet to be backed-up.

The backup device described in this embodiment may be a router, and may further include the following modules:

a second processing module 705, configured to determine that the increment of the serial number of the active data packet subsequent to the last backup exceeds a first increment threshold; or determine that the time subsequent to the last backup exceeds a first time threshold.

The backup device described in this embodiment may be a router, and is designed to implement the method shown in FIG. 4.

The backup device described in this embodiment may further include the following modules:

a second packaging module 706, configured to package packet information that carries a configuration command into the packet to be backed-up after receiving the configuration command; and/or package packet information that carries tunnel information or a tunnel deletion notification into the packet to be backed-up when adding or deleting a tunnel; and/or package packet information that carries a Dead Point Detection (DPD) serial number into the packet to be backed-up when updating the DPD serial number; and/or package packet information that carries a packet identifier (ID) into the packet to be backed-up when updating the packet ID.

The backup device described in this embodiment may be a router, and is designed to implement the method shown in FIG. 5.

Through the backup device in this embodiment, the second summing module pre-increases the serial number of the active data packet when backing up the serial number, and therefore, after the service is switched over from the active device to the standby device, the active device still regards the data packet sent by the former standby device as a new data packet and receives the data packet, which prevents service interruption caused by the switchover. Besides, the second packaging module in this embodiment adds more backup data, and therefore, the complete data is backed up upon occurrence of an exceptional event, and the continuity of service processing is improved in the process of two-node cluster hot backup.

Figure 8:
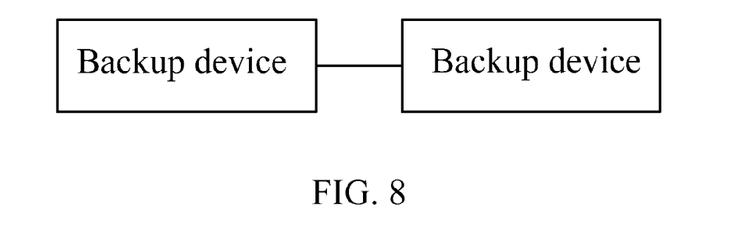
FIG. 8 is schematic diagram of a backup system according to an embodiment of the present invention.

FIG. 8 is schematic diagram of a backup system according to an embodiment of the present invention. The backup system in this embodiment includes:

at least one backup device shown in FIG. 6 or FIG. 7.

The backup device in this embodiment may be a router, and is designed to implement the methods shown in FIG. 1 to FIG. 5.

If the backup system in this embodiment includes at least one backup device shown in FIG. 6, the backup device is configured to: receive a packet to be backed-up; obtaining a serial number of data packet from an active device by analyzing the packet, wherein the serial number is carried in the packet; obtain a serial number of a data packet from a standby device by calculating the serial number of the data packet from the active device and a specific increment value; determine that an increment of the serial number of the data packet from the active device exceeds a first increment threshold; and back up the serial number of the data packet from the standby device upon the determination. The backup device is further configured to: obtain a configuration command carried in the packet to be backed-up by analyzing the packet to be backed-up, and performing configuration according to the configuration command; and/or obtain tunnel information carried in the packet to be backed-up by analyzing the packet to be backed-up, and reconstructing a tunnel corresponding to the tunnel information according to the tunnel information; and/or obtain a tunnel deletion notification carried in the packet to be backed-up by analyzing the packet to be backed-up, and deleting a tunnel corresponding to the tunnel deletion notification according to the tunnel deletion notification; and/or obtain a Dead Point Detection (DPD) serial number carried in the packet to be backed-up by analyzing the packet to be backed-up, and backing up the DPD serial number; and/or obtain a packet identifier (ID) carried in the packet to be backed-up by analyzing the packet to be backed-up, and backing up the packet ID.

If the backup system in this embodiment includes at least one backup device shown in FIG. 7, the active device is configured to: obtain a serial number of data packet from an active device; obtain a serial number of data packet from a standby device by calculating a sum of the serial number of the data packet from the active device and a specific increment value; package the serial number of the data packet from the standby device into a packet to be backed-up; and send the packet to be backed-up. The active device is further configured to: determine that an increment of the serial number of the data packet from the active device after the previous backup operation exceeds a first increment threshold; and/or determine that a period time after the previous backup operation exceeds a first time threshold. The active device is further configured to: package packet information that carries a configuration command into the packet to be backed-up after receiving the configuration command; and/or package packet information that carries tunnel information or a tunnel deletion notification into the packet to be backed-up when adding or deleting a tunnel; and/or package packet information that carries a Dead Point Detection (DPD) serial number into the packet to be backed-up when updating the DPD serial number; and/or package packet information that carries a packet identifier (ID) into the packet to be backed-up when updating the packet ID.

Through the backup system in this embodiment, the serial number of the data packet from the active device is pre-increased when the backup device backs up the serial number of the data packet, and therefore, after the service is switched over from the active device to the standby device, the active device still regards the data packet sent by the former standby device as a new data packet and receives the data packet, which prevents service interruption caused by the switchover and improves continuity of service processing in the process of two-node cluster hot backup.

Finally, it should be noted that the above embodiments are merely provided for describing the technical solutions of the present invention, but not intended to limit the present invention. It is apparent that persons skilled in the art can make various modifications and variations to the invention without departing from the spirit and scope of the invention. The present invention is intended to cover the modifications and variations provided that they fall in the scope of protection defined by the following claims or their equivalents.

What is claimed is:

1. A backup method, executed by a first device, the method comprising:
    receiving a backup packet from a second device, wherein the backup packet carries a first serial number that indicates a serial number of a data packet sent by the second device to a peer device;
    obtaining the first serial number by analyzing the backup packet;
    obtaining a second serial number by calculating a sum of the first serial number and a specific increment value, wherein the specific increment value is K multiplied by a preset value, wherein the preset value indicates an increment of the first serial number between two backup operations on the second device, where K is a value taken from the group consisting of: 2, 3, and 4; and
    sending, to the peer device, a data packet with the second serial number.

2. The method according to claim 1, further comprising at least one of the set of steps consisting of:
    obtaining a configuration command carried in the backup packet by analyzing the backup packet, and performing configuration according to the configuration command;
    obtaining tunnel information carried in the backup packet by analyzing the backup packet, and reconstructing a tunnel corresponding to the tunnel information according to the tunnel information;
    obtaining a tunnel deletion notification carried in the backup packet by analyzing the backup packet, and deleting a tunnel corresponding to the tunnel deletion notification according to the tunnel deletion notification;
    obtaining a Dead Point Detection (DPD) serial number carried in the backup packet by analyzing the backup packet, and backing up the DPD serial number; and
    obtaining a packet identifier (ID) carried in the backup packet by analyzing the backup packet, and backing up the packet ID.

3. The method according to claim 1, further comprising:
    obtaining tunnel information carried in the backup packet by analyzing the backup packet; and reconstructing a tunnel corresponding to the tunnel information according to the tunnel information, wherein the tunnel information comprises tunnel serial number information or tunnel traffic information.

4. The method according to claim 3, further comprising:
    when the tunnel information is the tunnel traffic information, modifying the tunnel traffic information of the first device according to the tunnel traffic information so that the tunnel traffic information of the second device is equal to the tunnel traffic information of the first device.

5. A backup method, executed by a first device, the method comprising:
    obtaining a first serial number wherein the first serial number indicates a serial number of a data packet sent by the first device to a peer device;
    determining whether an increment of the first serial number after a previous backup operation exceeds a preset value;
    based on the determined result of the first serial number after the previous backup operation exceeds the present value, obtaining a second serial number by calculating a sum of the first serial number and a specific increment value, wherein the second serial number indicates a serial number of a data packet to be sent by a second device to the peer device, the specific increment value is K multiplied by the preset value, where K is a value taken from the group consisting of: 2, 3 and 4;
    packaging the second serial number into a backup packet; and
    sending the backup packet to the second device.

6. The method according to claim 5, further comprising at least one of the set of steps consisting of:
    packaging packet information that carries a configuration command into the backup packet after receiving the configuration command delivered by an upper-layer device or a user of the first device;
    packaging packet information that carries tunnel information into the backup packet when adding a tunnel; or packaging packet information that carries a tunnel deletion notification into the backup packet when deleting a tunnel;
    packaging packet information that carries a Dead Point Detection (DPD) serial number into the backup packet when updating the DPD serial number; and
    packaging packet information that carries a packet identifier (ID) into the backup packet when updating the packet ID.

7. A non-transitory computer readable medium including computer-executable instructions for execution on a backup device, which is configured to operate as a first device,
    such that when the computer-executable instructions are executed by the backup device a method is carried out comprising:
    receiving, by the first device, a backup packet from a second device, wherein the backup packet carries a first serial number that indicates a serial number of a data packet sent by the second device to a peer device;
    obtaining, by the first device, the first serial number by analyzing the backup packet;
    obtaining, by the first device, a second serial number by calculating a sum of the first serial number and a specific increment value, wherein the specific increment value is K multiplied by a preset value, wherein the preset value indicates an increment of the first serial number between two backup operations on the second device, where K is a value taken from the group consisting of: 2, 3 and 4; and
    sending, by the first device to the peer device, a data packet with the second serial number.

8. The computer-readable medium according to claim 7, further comprising computer-executable instructions for:
    implementing, by the first device, at least one of the set of steps consisting of:
    obtaining a configuration command carried in the backup packet by analyzing the backup packet, and perform configuration according to the configuration command;
    obtaining tunnel information carried in the backup packet by analyzing the backup packet, and reconstruct a tunnel corresponding to the tunnel information according to the tunnel information;
    obtaining a tunnel deletion notification carried in the backup packet by analyzing the backup packet, and delete a tunnel corresponding to the tunnel deletion notification according to the tunnel deletion notification; and obtaining a Dead Point Detection (DPD) serial number carried in the backup packet by analyzing the backup packet, and back up the DPD serial number; and obtain a packet identifier (ID) carried in the backup packet by analyzing the backup packet, and back up the packet ID.

9. The computer-readable medium according to claim 7, further comprising computer-executable instructions for:
obtaining tunnel information carried in the backup packet by analyzing the backup packet; and
reconstructing a tunnel corresponding to the tunnel information according to the tunnel information, wherein the tunnel information comprises tunnel serial number information or tunnel traffic information.

10. A non-transitory computer readable medium including computer-executable instructions for execution on a backup device, which is configured to operate as an first device,
such that when the computer-executable instructions are executed by the backup device a method is carried out comprising:
obtaining a first serial number, wherein the first serial number is a serial number of a data packet sent by the first device to a peer device;
determining whether an increment of the first serial number after a previous backup operation exceeds a preset value;
based on the determined result of the first serial number after the previous backup operation exceeds the present value, obtaining a second serial number by calculating a sum of the first serial number and a specific increment value, wherein the second serial number indicates a serial number of a data packet to be sent by a second device to the peer device, the specific increment value is K multiplied by the present value, where K is a value taken from the group consisting of: 2, 3 and 4;
packaging the second serial number into a backup packet; and
sending the backup packet to the second device.

11. The computer-readable medium according to claim 10, further comprising computer-executable instructions for:
implementing at least one of the set of steps consisting of:
packaging packet information that carries a configuration command into the backup packet after receiving the configuration command delivered by an upper-layer device or a user of the first device;
packaging packet information that carries tunnel information into the backup packet when adding or deleting a tunnel; or package packet information that carries a tunnel deletion notification into the backup packet when deleting a tunnel;
packaging packet information that carries a Dead Point Detection (DPD) serial number into the backup packet when updating the DPD serial number; and
packaging packet information that carries a packet identifier (ID) into the backup packet when updating the packet ID.

* * * * *